US010074194B2

(12) United States Patent
Horn et al.

(10) Patent No.: US 10,074,194 B2
(45) Date of Patent: Sep. 11, 2018

(54) GRAPHICAL OBJECT CONTENT RENDITION

(71) Applicant: Microsoft Technology Licensing, LLC, Redmond, WA (US)

(72) Inventors: Stephanie L. Horn, Bellevue, WA (US); Darrin D. House, Everett, WA (US); Jie Li, Bellevue, WA (US); Ancuta I. Zaharia, Sammamish, WA (US); Haitao He, Redmond, WA (US); Constance W. Gervais, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/373,302

(22) Filed: Dec. 8, 2016

(65) Prior Publication Data

US 2018/0165837 A1    Jun. 14, 2018

(51) Int. Cl.
| | | |
|---|---|---|
| *G06T 11/40* | (2006.01) | |
| *G06T 7/90* | (2017.01) | |
| *G06T 7/12* | (2017.01) | |
| *G06T 11/00* | (2006.01) | |

(52) U.S. Cl.
CPC .............. *G06T 11/001* (2013.01); *G06T 7/12* (2017.01); *G06T 7/90* (2017.01); *G06T 11/40* (2013.01); *G06T 2207/10024* (2013.01); *G06T 2207/20021* (2013.01); *G06T 2210/32* (2013.01)

(58) Field of Classification Search
None
See application file for complete search history.

(56) References Cited

U.S. PATENT DOCUMENTS

| | | | |
|---|---|---|---|
| 6,442,606 B1 * | 8/2002 | Subbaroyan .......... | G06F 17/218 707/E17.108 |
| 7,873,946 B2 | 1/2011 | Lathrop et al. | |
| 8,711,147 B2 | 4/2014 | Breeds et al. | |
| 9,152,624 B1 | 10/2015 | Krallman et al. | |
| 2004/0218451 A1 * | 11/2004 | Said ...................... | G06F 3/0481 365/222 |

OTHER PUBLICATIONS

"Accessible SVGs in High Contrast Mode", https://css-tricks.com/accessible-svgs-high-contrast-mode/, Published on: Sep. 22, 2016, 9 pages.
Kloots, Todd, "Techniques for High-Contrast-Friendly Icons", https://developer.yahoo.com/blogs/ydn/techniques-high-contrast-friendly-icons-153038779.html, Published on: Apr. 5, 2013, 9 pages.

(Continued)

*Primary Examiner* — Kee M Tung
*Assistant Examiner* — Yanna Wu
(74) *Attorney, Agent, or Firm* — Holzer Patel Drennan (57) ABSTRACT

An image rendering system having an image rendition module to determine formats of an image and a rendering theme and in response to these formats meeting a predetermined condition, parse the image into a plurality of image components and display at least one of the plurality of image components with a fill color as a background color of the rendering theme and with an alternate color of the rendering theme as an outline color of the at least one component.

20 Claims, 5 Drawing Sheets

(56) References Cited

OTHER PUBLICATIONS

"What's new and improved in Office 2016 for Office 365", https://support.office.com/en-us/article/What-s-new-and-improved-in-Office-2016-for-Office-365-95c8d81d-08ba-42c1-9141-bca4603e1426, Retrieved on: Nov. 15, 2016, 28 pages.
"Configuring High Contrast Mode", https://web.archive.org/web/20151031155150/http:/docs.oracle.com/middleware/iet112/jet/developer/GUID-F588A45D-6954-4561-A70C-4C72B90B3BF5.htm, Published on: Oct. 31, 2015, 3 pages.
"Insert SVG images in Microsoft Office", https://support.office.com/en-us/article/Insert-SVG-images-in-Microsoft-Office-69f29d39-194a-4072-8c35-dbe5elea528c?ui=en-US&rs=en-US&ad=US, Retrieved on: Nov. 15, 2016, 5 pages.
"Visualization: Column Chart", https://developers.google.com/chart/interactive/docs/gallery/columnchart, Published on: Sep. 12, 2016, 51 pages.
"High-contrast mode", https://web.archive.org/web/20120620234232/http:/msdn.microsoft.com/en-us/library/windows/desktop/hh848048(v=vs.85).aspx, Published on: Jun. 20, 2012, 3 pages.
"JavaScript Extension Toolkit (JET) Developing Applications with Oracle JET", https://docs.oracle.com/middleware/iet112/jet/developer/GUID-8F2E8CCA-6797-4205-8E34-DF9D77530865.htm, Published on: 2015, 12 pages.
"Inline SVG Used for Buttons and Links", https://web.archive.org/web/20150916181436/http:/haltersweb.github.io/Accessibility/svg.html, Published on: Sep. 16, 2015, 2 pages.
"CSS styling for high contrast mode sample", https://code.msdn.microsoft.com/windowsapps/High-Contrast-b36079d8, Published on: Nov. 26, 2013, 2 pages.
"ms-high-contrast-adjust property", https://web.archive.org/web/20120409170712/http:/msdn.microsoft.com/en-us/library/windows/apps/hh441137.aspx, Published on: Apr. 9, 2012, 1 pages.
"ms-high-contrast media feature", https://web.archive.org/web/20140205115105/http:/msdn.microsoft.com/en-us/library/windows/apps/hh465764.aspx, Published on: Feb. 5, 2014, 2 pages.
Freear, Nick, "High contrast and ignore colours", http://nick.freear.org.uk/2015/10/23/high-contrast-ignore-colors.html, Published on: Oct. 23, 2015, 4 pages.
Tomanek, Jakub, "Accessibility in High Contrast Mode", http://www.slideshare.net/TheZero1/webexpo-highcontrast, Published on: Sep. 23, 2013, 4 pages.
"Make the computer easier to see", https://support.microsoft.com/en-us/help/14207/windows-7-make-computer-easier-to-see, Published on: Sep. 1, 2016, 2 pages.

* cited by examiner

GRAPHICAL OBJECT CONTENT RENDITION

BACKGROUND

Computing devices display a wide variety of content including text content, images, videos, etc. In modern computing systems, interconnected computing devices receive content, including images in a wide variety of formats from the Internet or other sources. Depending on the type of computing device or the system used by a computing device, one of a large number of content rendering themes may be used to render the content, including images, received by the computing device.

SUMMARY

An image rendering system having an image rendition module to determine formats of an image and a rendering theme and in response to these formats meeting a predetermined condition, parse the image into a plurality of image components and display at least one of the plurality of image components with a fill color as a background color of the rendering theme and with an alternate color of the rendering theme as an outline color of the at least one component.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTIONS

The described technology includes an image rendering system having an image rendition module to determine formats of an image and a rendering theme and in response to these formats meeting a predetermined condition, parse the image into a plurality of image components and display at least one of the plurality of image components with a fill color as a background color of the rendering theme and with an alternate color of the rendering theme as an outline color of the at least one component.

In one implementation, the image rendition module may receive the image from a scalable vector graphics (SVG) object and parse the image into several image components and display the image components in a high contrast rendering theme. In one implementation, the image may also include text, alpha numeric characters, symbols, etc., as part of the image. The image rendition module may treat each of such characters or symbols as a separate image component.

Figure 1:
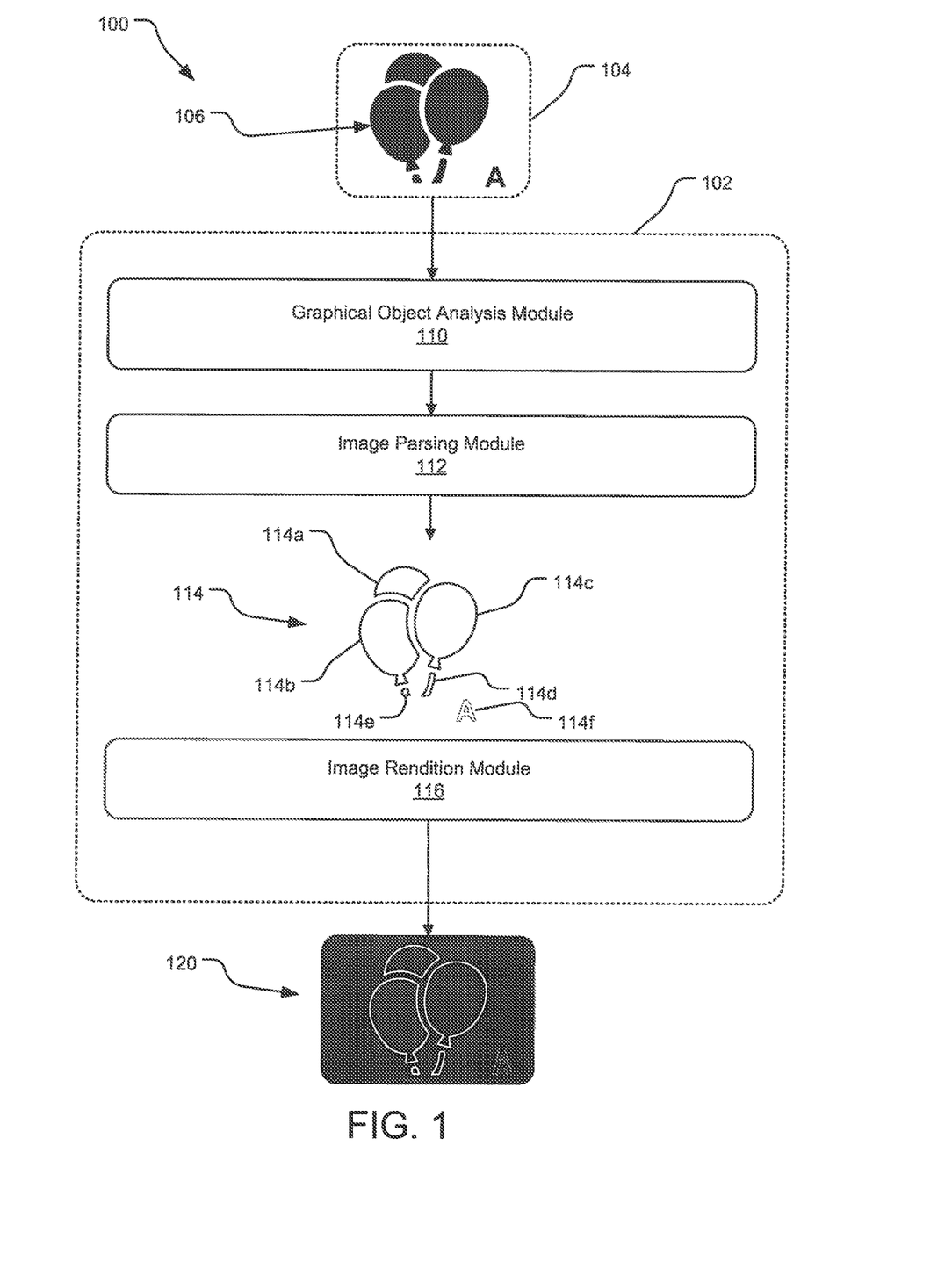
FIG. 1 illustrates example flow of information for the image rendition system disclosed herein.

FIG. 1 illustrates example flow of information 100 for the image rendition system disclosed herein. Specifically, a graphical object rendition module 102 allows rendering an image from a graphic object to a user. The graphical object rendition module 102 may receive a graphical object 104 with an image 106 embedded therein. For example, the graphical object 104 may be a hypertext object including the image 106. In one implementation, the graphical object rendition module 102 may be implemented in a browser of a computing device such as the computer 20 disclosed below in FIG. 5. The format of the image 106 may be of a raster format such as joint photographic experts group (JPEG), tagged image file format (TIFF), graphics interchange format (GIF), portable network graphics (PNG), bitmap image format (BMP), etc., a vector format such as computer graphics metafile (CGM), scalable vector graphics (SVG), etc., or metafile formats such as Windows metafile format (WMF) and enhanced Windows metafile format (EMF).

The graphical object rendition module 102 includes a graphical object analysis module 110 to analyze the graphical object 104. Specifically, the graphical object analysis module 104 may determine the type of format of the image 106. The graphical object analysis module 110 also analyzes the target rendering theme that is used to display the image. For example, the graphical object analysis module 110 may determine that in one implementation, the image 106 is rendered using a high contrast theme.

The rendition module 102 determines if the format of the image 106 and the rendering theme meet a predetermined condition. For example, the predetermined condition may be that the format of the image 106 is SVG and the rendering theme is high contrast rendering theme. Alternatively, other combination of the image format and the rendering theme may be used as the pre-determined condition.

In one instance, after determining the format of the image 106 and the rendering theme, the graphical object analysis module 110 may determine that the format of the image is SVG format and the image rendering theme is a high contrast theme. In this case, an image parsing module 112 parses the image 106 into one or more image components 114. For example, in the illustrated implementation of FIG. 1, where the image 106 includes a bunch of balloons, the image parsing module 112 parses the images 106 into a series of components 114a, 114b, 114c, 114d, and 114e (collectively referred to herein as the "image components 114"). Subsequently, an image rendition module 116 displays the image components 114 with a background color of the rendering theme as the fill color of the image components 114 and an alternate color of the rendering theme an outline color of the image components 114. The image 106 may also include text characters, alphanumeric characters, symbols, etc. In such a case, the image parsing module 112 also parses such characters or symbols into individual component. For example, a component 114f indicating an alphanumeric character is parsed into a separate component and rendered with its outline using an alternate color of the rendering theme.

For example, if the background color of the rendering theme was black, each of the image components 114 is displayed with black fill color. However, as these are both selected to be the same, the fill color of the image components 114 is not visible on the rendering theme background. However, because an alternate color other than the background color of the rendering theme is used to display the outline of the image components 114, the image components 114 are visible due to the difference between the background color of the rendering theme and the outline color of the image components 114. In one implementation, such alternate color used to display the outline of the image components 114 may the text color of the rendering theme. Other examples of such alternate colors of the rendering theme used to display the outline of the image components are colors of hyperlinks, colors of disabled texts from the high contrast theme, etc.

Because of the rendering the image 106 using in this manner, the rendition of the image 106 is reproduced as illustrated by the rendition 120. Specifically, the image component 114c, which is an image of a balloon, is rendered filled with black fill color and white outline, where the white outline may be the text color of the rendering theme.

Figure 2:
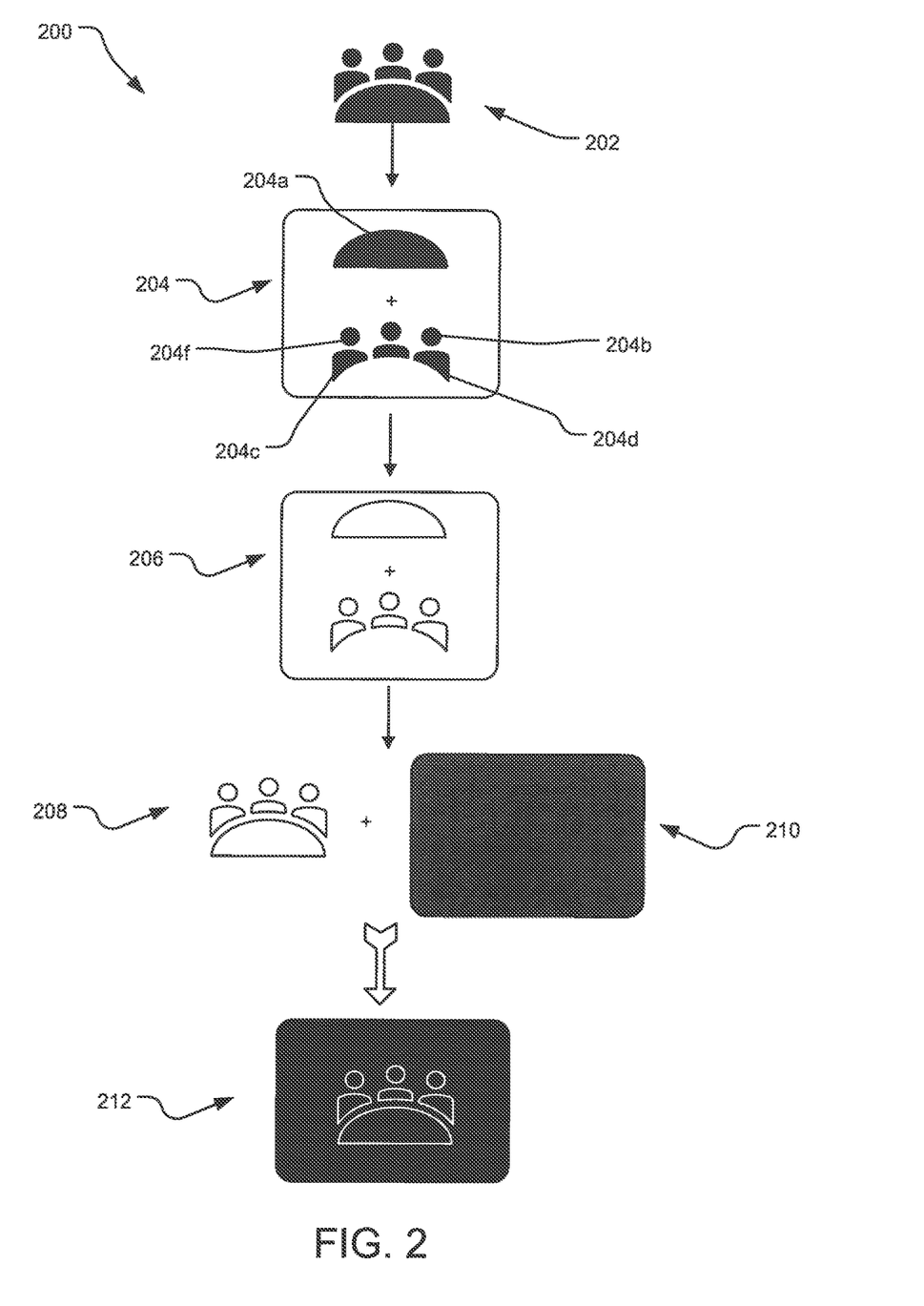
FIG. 2 illustrates alternative example flow of information for the image rendition system disclosed herein.

FIG. 2 illustrates alternative example flow of information 200 for the image rendition system disclosed herein. Specifically, FIG. 2 shows an image 202 that may be retrieved from an image object for rendition. For example, the image 202 may be an SVG image that needs to be rendered on a high contrast rendering theme. The image 202 is parsed into several image components 204a, 204b, 204c, etc. (collectively referred to as the image components 204). In the example illustration, each of the image components 204 may be a part of the image 202 that can be defined by a fill area covered by an outline. Thus, for example, the image component 204f is an image component that has a circular outline covering a circular fill area. Specifically, each of the image components 204 are parsed so that each of these image components 204 is spatially separate from the other of the image components 204. This allows each of the image components 204 to be rendered using an outline and a fill color.

The outlines of each of the image components is illustrated by 206. Each of the image components 204 are rendered in a high contrast rendering theme with a background 210 using the background color of the high contrast rendering theme as the fill color of the image components 204 and an alternate color of the high contrast rendering theme as the outlines 208 of the image components 204. Because the outlines 208 of the image components 204 are different from the background 210 of the high contrast rendering theme and because the fill color of the image components 204 is the same as the background 210 of the high contrast rendering theme, the image components 204 are visible by their outlines as shown by the rendition 212. While the present implementation discloses displaying the image components 204 using the background color of the high contrast rendering theme as the fill color of the image components 204, in alternative implementations, other color of the high contrast theme may be used as the fill color of the image components.

Figure 3:
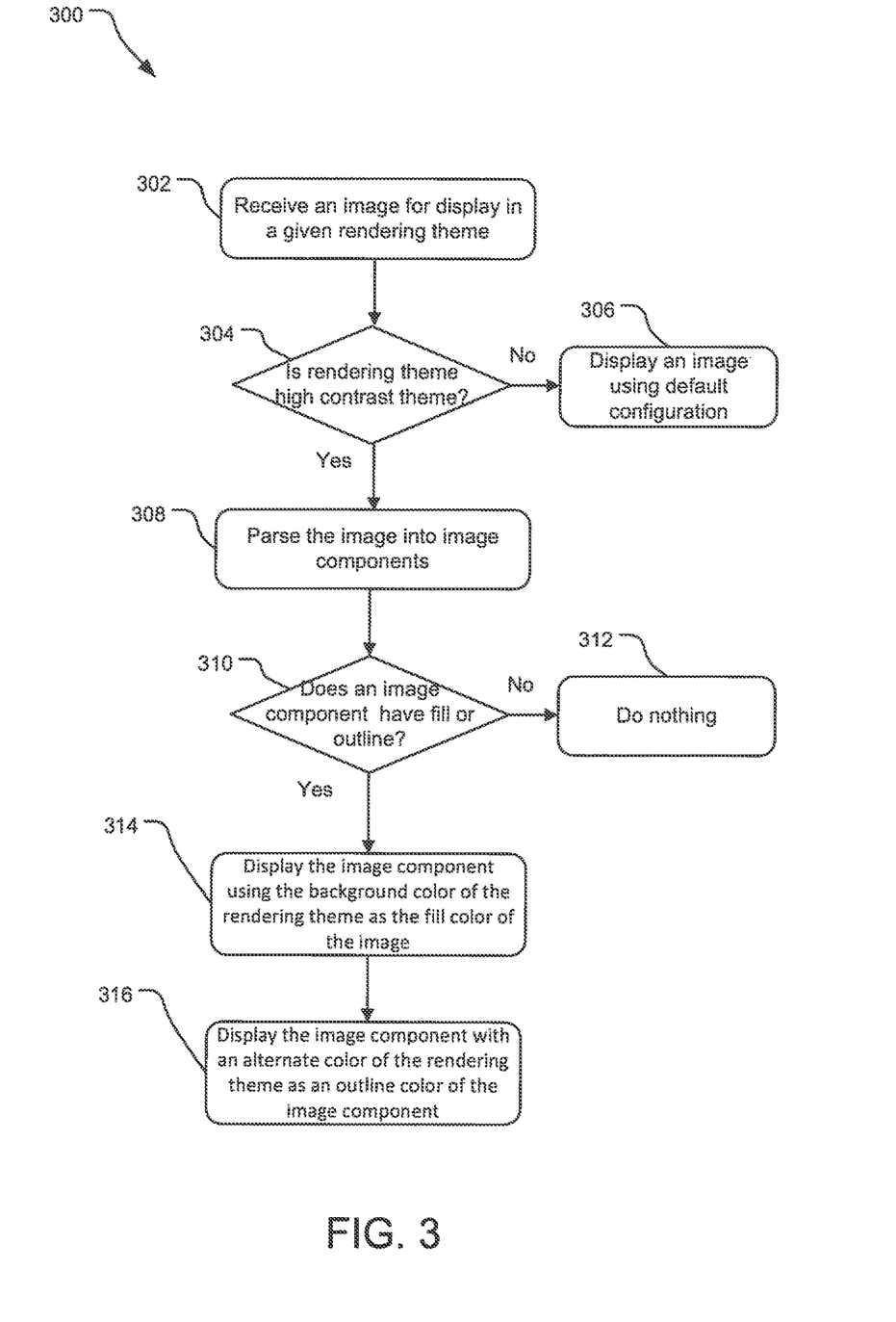
FIG. 3 illustrates example operations for the image rendition system disclosed herein.

FIG. 3 illustrates example operations 300 for the image rendition system disclosed herein. An operation 302 receives an image for display in a given rendering theme. For example, the image may be an SVG image received in a graphical object. An operation 304 determines whether the rendering theme used to display the image is a high contrast theme. If the rendering theme is not a high contrast theme, an operation 306 displays the image using default configuration. However, if the rendering theme is a high contrast theme, an operation 308 parses the image into image components.

Subsequently, an operation 310 determines if an image component has a fill color or an outline color. If the image component has neither of a fill nor an outline, an operation 312 does nothing. However, if the image component does have at least one of a fill color and an outline, an operation 314 displays the image component with the background color of the rendering theme as the fill color of the image component and an operation 316 displays the image component with an alternate color of the rendering theme as an outline color of the image component. In an implementation, the alternate color of the rendering theme used to display the outline of the image component may be a text color of the rendering theme. Alternatively, colors of hyperlink, disabled text, etc., may also be used to display the outline of the image component.

Specifically, the operation 316 displays the outline of the image component to an alternate color only for displaying the image component in a high contrast rendering theme. Thus, if the image were displayed in another rendering theme, the image components may not be rendered with an outline.

While the illustrated operation 300 disclose the operations 314 and 316 as separate operations, in one implementation a single operation may display the image component with the background color of the rendering theme as the fill color of the image component the image component with an alternate color of the rendering theme as an outline color of the image component. Furthermore, the operations 310 to 316 are executed for each of the image components of the image. For example, if the operation 308 parses the image into five image components, the operations 310 to 316 may be repeated five times—once for each of the five image components.

Figure 4:
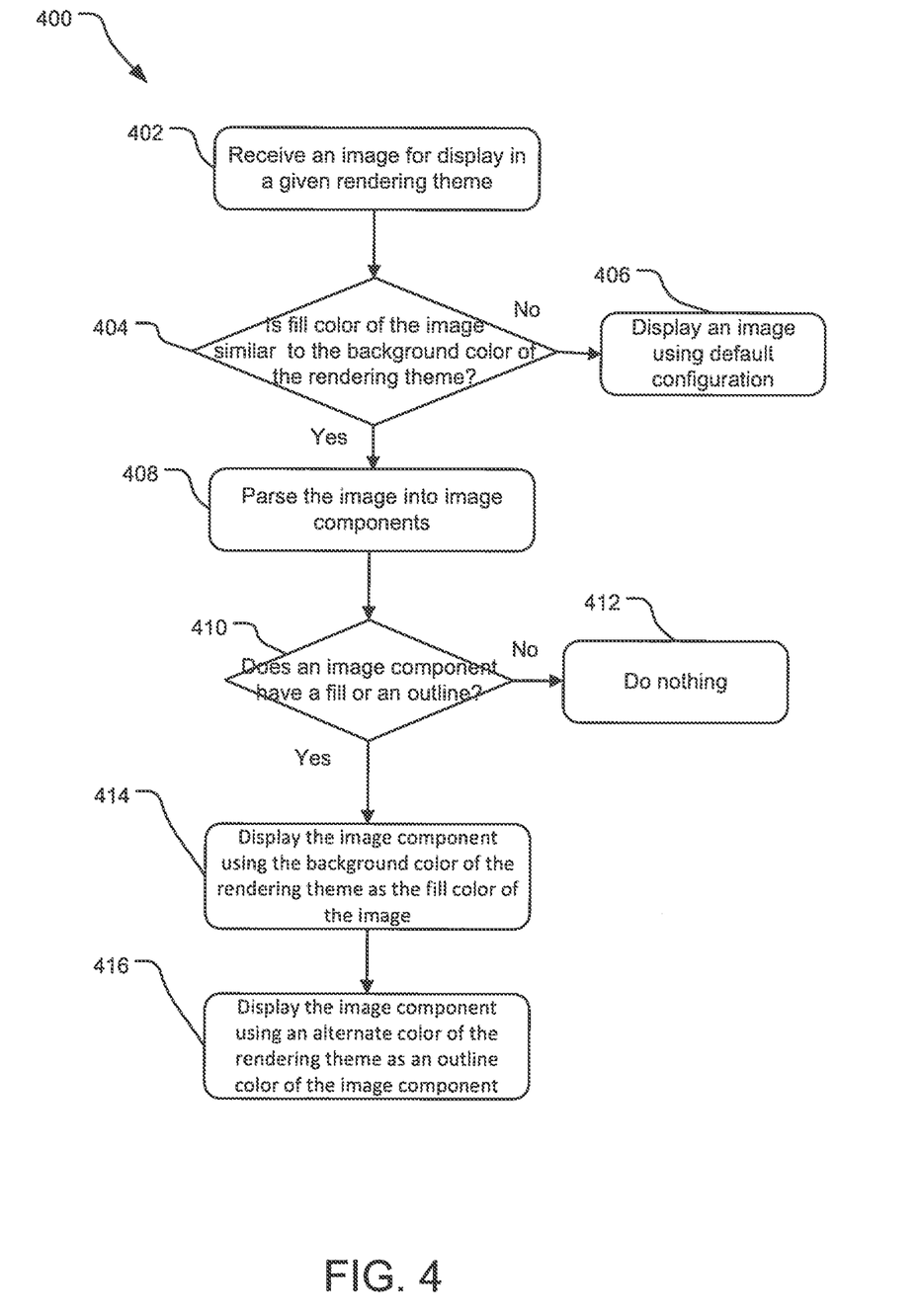
FIG. 4 illustrates alternative example operations for the image rendition system disclosed herein.

FIG. 4 illustrates alternative example operations 400 for the image rendition system disclosed herein. An operation 402 receives an image for display in a given rendering theme. An operation 404 determines if a fill color of the image is substantially similar to a background color of the rendering theme. For example, if the fill color of the image is blue and the background color of the rendering theme is also substantially close to blue, the image will not be easily visible in the rendering theme. In one implementation, the similarity between the fill color of the image and the background color of the rendering theme may be determined based on a similarity condition that is evaluated based on some numeric values of the colors being compared. For example, in one implementation, a distance between the fill color of the image and the background color of the rendering theme may be calculated in a color space. For example, such numeric condition may be based on a distance in three-dimensional color space.

If the fill color of the image is not similar to the background color of the rendering theme, an operation 406 displays the image using default image rendering configuration. On the other hand, if the image is not similar to the background color of the rendering theme are substantially similar, an operation 408 parses the image into several image components. An operation 410 determines if an image component has a fill color or an outline color. If the image component has neither a fill color nor an outline color, an operation 412 does nothing.

If the image component has one of a fill color and an outline color, an operation 414 displays the image component with the background color of the rendering theme as the fill color of the image and an operation 416 displays the image component using an alternate color of the rendering theme as an outline color of the image component. As a result of such displaying of the image component with the background color of the rendering theme as the fill color of the image and the image component using an alternate color of the rendering theme as an outline color of the image component, the image component displays is visible on the background color of the rendering theme by its outlines.

If an image has more than one image component, operations 410 to 416 are repeated for each of such image components.

Figure 5:
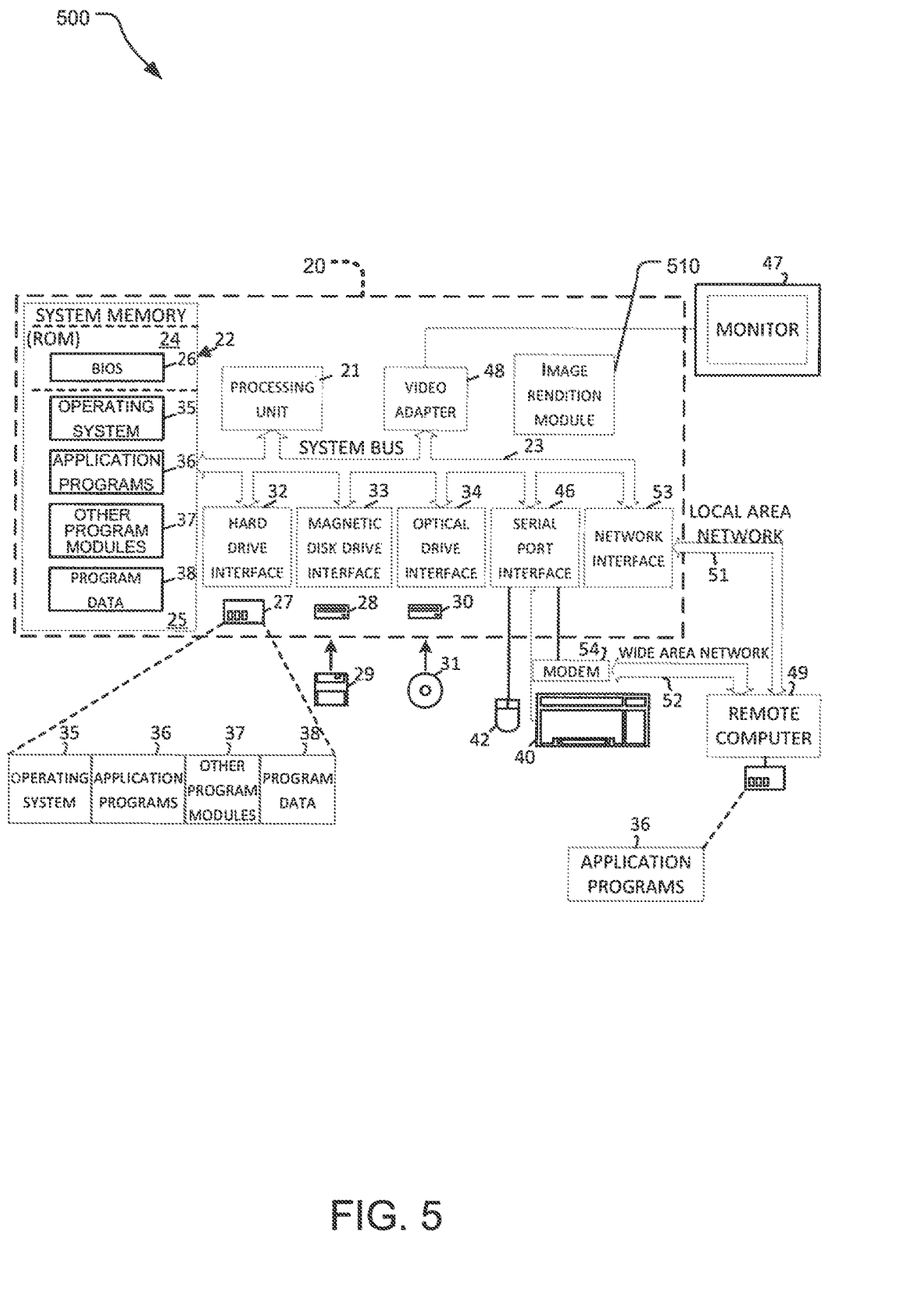
FIG. 5 illustrates an example system that may be useful in implementing the image rendition system disclosed herein.

FIG. 5 illustrates an example system 500 that may be useful in implementing the image rendition system disclosed herein. The example hardware and operating environment of FIG. 5 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 500, the computer 20 also includes an image rendition module 510 providing one or more functions of the image rendition operations disclosed herein. The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a signal sampling module configured to generate sampled signals based on the reflected modulated signal 72 as illustrated in FIG. 1. In one implementation, a frequency unwrapping module including instructions to unwrap frequencies based on the sampled reflected modulations signals may be stored in memory of the computer 20, such as the read-only memory (ROM) 24 and random access memory (RAM) 25, etc.

Furthermore, instructions stored on the memory of the computer 20 may be used to generate a transformation matrix using one or more operations disclosed in FIG. 5. Similarly, instructions stored on the memory of the computer 20 may also be used to implement one or more operations of FIG. 6 to determine a correct unwrapping tuple. The memory of the computer 20 may also store an LUT, such as the one dimensional LUT disclosed in FIG. 8.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for requesting, processing, and rendering mapping data may be stored in system memory 22 and/or storage devices 29 or 31 and processed by the processing unit 21. Mapping data and/or layer prioritization scheme data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The graphical object content rendition system disclosed herein provides a technological problem necessitated by the differences in various image formats and rendering themes. Specifically, the graphical object content rendition system disclosed herein provides an unconventional technical solution to this technological problem by parsing the image into several image components and displaying the image components using background color of the rendering theme as the fill color of the image components and by displaying outline of the image components using an alternate color of the rendering theme.

A method disclosed herein includes determining an image format of an image, determining rendering theme for rendering the image, determining that the combination of the image format and the rendering theme meets a predetermined condition, parsing the image into a plurality of image components and displaying at least one of the plurality of image components using background color of the rendering theme as a fill color and using an alternate color of the rendering theme as an outline color of the at least one of the plurality of image component. In one implementation, the predetermined condition is that the image format is scalable vector graphic (SVG) format and the rendering theme is high contrast rendering theme.

In one implementation, the alternate color is a text color of the high contrast rendering theme and in another implementation, the alternate color is a hyperlink color of the high contrast rendering theme. In one example implementation, parsing the image into a plurality of image components further comprises parsing the image into the plurality of image component such that each of the plurality of image components is spatially separate from each of the other of the plurality of image components.

In one implementation, one or more of the plurality of image components has a fill color and an outline. In an alternative implementation, determining that at least one of the plurality of image components is invisible on the rendering theme further comprises determining a similarity between a fill color of the at least of the image components and a background color of the rendering theme. Yet alternatively, the predetermined condition is that based on the image format and the rendering theme, the image is substantially invisible using the rendering theme.

A method disclosed herein includes determining a fill color of an image, determining a background color of an image rendering theme, and if the fill color of the image and the background color of the image rendering theme meet a color similarity condition then parsing the image into one or more image components, displaying the one or more image components using the background color of the rendering theme as fill color of the components, and displaying an outline of the one or more image components using a rendering theme color other than the background color of the rendering theme.

In an alternative implementation, the rendering theme color other than the background color of the rendering theme is text color of the rendering theme. In another implementation, the rendering theme color other than the background color of the rendering theme is hyperlink color of the rendering theme. Yet alternatively, the rendering theme color other than the background color of the rendering theme is color with a numeric value above a predetermined threshold compared to the background color of the rendering theme. The image is a scalable vector graphic (SVG) image and the rendering theme is a high contrast rendering theme. In an implementation, parsing the image into a plurality of image components further comprises parsing the image into the plurality of image component such that each of the plurality of image components is spatially separate from each of the other of the plurality of image components.

An implementation disclosed herein includes a computer program product embodied on a computer readable storage medium for rendering images, including computer code for determining that an image is invisible on a rendering theme, computer code for parsing the image into a plurality of image components, and computer code for displaying the at least one component with a fill color as a background color of the rendering theme and with an alternate color of the rendering theme as an outline color of the at least one component.

Some embodiments of the image rendition system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The image rendition system disclosed herein may include a variety of tangible computer-readable storage media and intangible computer-readable communication signals. Tangible computer-readable storage can be embodied by any available media that can be accessed by the image rendition system disclosed herein and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the image rendition system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

The implementations of the image rendition system described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:
    determining an image format of an image, the image format specifying a fill color of the image;
    determining rendering theme for rendering the image, the rendering theme specifying a background color;
    determining that the combination of the image format and the rendering theme meets a color similarity condition;
    in response to determining that the fill color of the image and the background color of the image meet a color similarity condition, parsing the image into a plurality of image components; and
    displaying at least one of the plurality of image components using the background color of the rendering theme as a fill color and using an alternate color of the rendering theme as an outline color of the at least one of the plurality of image components.

2. The method of claim 1 wherein image format is scalable vector graphic (SVG) format and the rendering theme is high contrast rendering theme.

3. The method of claim 2, wherein the alternate color is a text color of the high contrast rendering theme.

4. The method of claim 2, wherein the alternate color is a hyperlink color of the high contrast rendering theme.

5. The method of claim 2, wherein parsing the image into a plurality of image components further comprises parsing the image into the plurality of image component such that each of the plurality of image components is spatially separate from each of the other of the plurality of image components.

6. The method of claim 5, wherein one or more of the plurality of image components has a fill color and an outline.

7. The method of claim 2, further comprising:
    determining that at least one of the plurality of image components is invisible on the rendering theme by determining a similarity between a fill color of the at least of the image components and a background color of the rendering theme.

8. The method of claim 1, wherein the color similarity condition is that based on the image format and the rendering theme, the image is substantially invisible using the rendering theme.

9. A method comprising;
    determining a fill color of an image;
    determining a background color of an image rendering theme; and
    if the fill color of the image and the background color of the image rendering theme meet a color similarity condition:
        parsing the image into one or more image components,
        displaying the one or more image components using the background color of the image rendering theme as a fill color of the one of more image components, and
        displaying an outline of the one or more image components using a rendering theme color other than the background color of the image rendering theme.

10. The method of claim 9, wherein the rendering theme color other than the background color of the rendering theme is a text color of the rendering theme.

11. The method of claim 9, wherein the rendering theme color other than the background color of the rendering theme is hyperlink color of the rendering theme.

12. The method of claim 9, wherein the rendering theme color other than the background color of the rendering theme is color with a numeric value above a predetermined threshold compared to the background color of the rendering theme.

13. The method of claim 9, wherein the image is a scalable vector graphic (SVG) image.

14. The method of claim 9, wherein the rendering theme is a high contrast rendering theme.

15. The method of claim 9, wherein parsing the image into a plurality of image components further comprises parsing the image into the plurality of image components such that each of the plurality of image components is spatially separate from each of the other of the plurality of image components.

16. A computer program product embodied on a computer readable storage medium for rendering images, comprising:
    computer code for determining that a fill color of an image and a background color of the image rendering theme meet a color similarity condition;
    computer code for parsing the image into a plurality of image components such that each of the plurality of image components is spatially separate from each of the other of the plurality of image components in response to determining that the fill color of the image and the background color of the image meet a color similarity condition; and
    computer code for displaying at least one of the plurality of components with the fill color as a background color of the rendering theme and with an alternate color of the rendering theme as an outline color of the at least one of the plurality of components.

17. The computer program product of claim 16, wherein image format of the image is scalable vector graphic (SVG) format.

18. The computer program product of claim 16, wherein the rendering theme is high contrast rendering theme.

19. The computer program product of claim 16, wherein the alternate color is a text color of the high contrast rendering theme.

20. The computer program product of claim 16, wherein the alternate color is a hyperlink color of the high contrast rendering theme.

* * * * *